United States Patent [19]

Bhattacharyya

[11] 4,271,013

[45] Jun. 2, 1981

[54] METHOD AND APPARATUS FOR REMOVING BIODEGRADABLE COMPOUNDS FROM WASTEWATER

[75] Inventor: Aniruddha Bhattacharyya, West Seneca, N.Y.

[73] Assignees: Republic Steel Corporation, Cleveland, Ohio; The Hanna Furnace Corporation, Buffalo, N.Y.

[21] Appl. No.: 32,897

[22] Filed: Apr. 24, 1979

Related U.S. Application Data

[63] Continuation-in-part of Ser. No. 13,679, Feb. 21, 1979.

[51] Int. Cl.$^3$ .............................. C02F 3/08; C02F 1/04
[52] U.S. Cl. .................................... 210/617; 210/96.1; 210/103; 210/109; 210/195.3; 203/33; 203/96; 55/70; 423/356; 210/626; 210/903; 210/631
[58] Field of Search ........................................ 210/3–7, 210/11, 59, 15–18, 60, 195.3, 207, DIG. 28, 28, 40, 39, 96.1, 103, 109; 423/356, 357; 203/10, 7, 33, 36, 37, 96; 55/70

[56] References Cited

U.S. PATENT DOCUMENTS

| | | | |
|---|---|---|---|
| 1,437,394 | 12/1922 | Brown | 210/17 |
| 1,437,401 | 12/1922 | Davis et al. | 210/40 |
| 2,199,767 | 5/1940 | Wells et al. | 210/2 |
| 3,278,423 | 10/1966 | Millar | 210/15 |
| 3,756,947 | 9/1973 | Fujii et al. | 210/11 |
| 3,767,570 | 10/1973 | Clapp | 210/40 |
| 3,803,029 | 4/1974 | Blecharyczyk | 210/17 |
| 3,871,999 | 3/1975 | Torpey | 210/17 |
| 3,904,518 | 9/1975 | Hutton et al. | 210/18 |
| 3,930,998 | 1/1976 | Knopp et al. | 210/5 |
| 3,939,068 | 2/1976 | Wendt et al. | 210/7 |
| 3,957,632 | 5/1976 | Knopp et al. | 210/18 |
| 3,980,556 | 9/1976 | Besik | 210/17 |
| 3,980,556 | 9/1976 | Besik | 210/17 |
| 4,009,098 | 2/1977 | Jeris | 210/17 |
| 4,033,875 | 7/1977 | Besik | 210/207 |
| 4,104,131 | 8/1978 | Didycz et al. | 203/7 |
| 4,108,735 | 8/1978 | Burcaw, Jr. et al. | 423/357 |
| 4,111,759 | 9/1978 | Didycz et al. | 203/37 |
| 4,132,636 | 1/1979 | Iwase et al. | 210/6 |

FOREIGN PATENT DOCUMENTS

| | | | |
|---|---|---|---|
| 1141267 | 8/1960 | Fed. Rep. of Germany | 423/356 |
| 50-2353 | 1/1975 | Japan | 210/11 |
| 176400 | 3/1922 | United Kingdom | 423/356 |

OTHER PUBLICATIONS

Adams, Jr., C. E.; "Treatment of a High Strength Phenolic and Ammonia Wastestream by Single and Multi-Stage Activated Sludge Process"; Proc. of the 29th Ind. Waste Conf.; pp. 617–630 (May 1974).

Flynn, B. P. et al.; "Startup of a 38 MGD Powdered Activated Carbon-Activated Sludge (PACT) Treatment System at Du Pont's Chamber Works"; W.P.C.F. Conf. Oct. 3, 1977.

Wong-Chong, G. H.; "Design and Operation of Biological Treatment for Coke Plant Wastewaters"; Carnegie Mellon Institute of Research; Sep. 1978.

Ganczarczyk, J. J.; "Nitrification of Coke Plant Effluents"; A Preliminary Report (1977–1978).

Ganczarczyk, J. & Associates Ltd.; "Studies on Second Stage Activated Sludge Treatment of Coke Plant Effluent"; Sep. 1976.

Ganczarczyk, J. & Associates Ltd.; "Conceptual Process Design Manual for Second-Stage Biological Treatment of Coke Plant Effluents"; Jul. 20, 1979.

*Primary Examiner*—Benoit Castel
*Attorney, Agent, or Firm*—Sandler & Greenblum

[57] ABSTRACT

A method for removing biodegradable compounds selected from the group comprising: phenolics, free and fixed ammonia compounds, thiosulfates, cyanides, thiocyanates, sulfides and the like from a feed wastewater. The method comprises the steps of treating the feed wastewater by adding soda ash thereto; and further treating the wastewater by means of an activated sludge treatment in a sludge reactor to reduce the level of biodegradable compounds in the wastewater.

A method for removing biodegradable compounds selected from the group comprising phenolics, free and fixed ammonia compounds, thiosulfates, cyanides, thiocyanates, sulfides and mixtures thereof from a feed wastewater comprising the steps of: treating the feed wastewater with an inorganic carbon source; and further treating the wastewater by means of a single-stage activated sludge treatment in a sludge reactor to reduce the level of said biodegradable compounds in the wastewater.

An apparatus for treating a wastewater containing biodegradable compounds including free and fixed ammonia. The apparatus comprises an ammonia still for removing free and fixed ammonia; a source of soda ash solution; and means connected to the source of soda ash solution for feeding soda ash solution from the soda ash source to the ammonia still to decompose the fixed ammonia in the wastewater. The apparatus further comprises a single-stage activated sludge reactor for treating the wastewater to reduce the level of biodegradable compounds in the wastewater.

15 Claims, 2 Drawing Figures

METHOD AND APPARATUS FOR REMOVING BIODEGRADABLE COMPOUNDS FROM WASTEWATER

BACKGROUND OF THE INVENTION

1. Cross-Reference to Related Applications

This application is a continuation-in-part of Application Ser. No. 13,679 filed Feb. 21, 1979, the disclosure of which is completely incorporated herein.

2. Field of the Invention

The invention relates to a method and apparatus for removing ammonia from wastewaters such as coke plant or coal conversion wastewaters and particularly raw ammonia liquors. The invention further relates to a method and apparatus for biologically treating wastewaters which have been previously treated to remove ammonia therefrom.

3. Description of Prior Art

Industrial effluents such as coke plant wastewaters often contain high levels of ammonia as well as phenols, cyanides, sulfides, thiocyanates, thiosulfates, and other compounds. In view of the fact that current federal regulations limit the amounts of ammonia and other compounds which may be discharged into bodies of water, numerous attempts at reducing pollutant content have been made.

With respect to coke plant wastewaters, ammonia removal has normally been achieved by means of a steam distillation process operated in conjunction with either lime or caustic addition.

Examples of previous treatment systems may, for example, be found in U.S. Pat. No. 3,278,423 to Millar which discloses a process for the treatment of aqueous crude effluent liquors from coal carbonizing plants. The process which comprises distilling the crude industrial liquor to first remove free ammonia. The partially treated effluent is next subjected to a biochemical oxidation step and is then treated by the addition of lime to convert fixed ammonia salts into free ammonia salts which may then be separated from the waste liquor by means of distillation.

While the addition of lime has indeed proven useful in converting fixed ammonia into free ammonia which may be liberated by means of distillation, such addition has resulted in fouling problems which have proven troublesome when the process is operated on an industrial scale. Thus, several attempts have been made to overcome fouling problems by means of the addition of scale inhibiting compounds.

U.S. Pat. No. 4,104,131 to Didycz et al discloses a water purification process for the removal of ammonia from wastewaters such as coke plant or coal conversion wastewaters which comprises the addition of lime in amounts sufficient to react with fixed ammonia salts present in the wastewater. The patent discloses the addition of a scale inhibitor compound selected from the class of certain organic phosphonates. The process is conducted in essentially two steps. In the first step, the free ammonia is distilled out of the effluent. The fixed ammonia level is substantially reduced in a second distillation step performed on the wastewater after it has been treated with lime and scale inhibitor compounds.

U.S. Pat. No. 4,108,735 to Burcaw et al traces the history of the use of steam stills to remove ammonia from weak ammonia liquor generated during the coking of coal. In the conventional process, the liquor is first steam distilled in what is called a "free leg" to remove free ammonia and ammonia compounds. The once distilled weak ammonia liquor is then combined with an aqueous slurry of lime and then distilled in what is known as the "fixed" leg of the process where a direct countercurrent flow of steam distills the hydrated ammonia from the lime-liquor slurry. Both the free and fixed legs of the ammonia still comprise an upright column having internally disposed horizontal plates or trays. Each plate is equipped with gas-liquid contacting means through which ascending steam may pass. The gas-liquid contacting means are conventionally either trays comprising sieve holes or bubble cap assemblies. As the patent points out, a major drawback inherent in using a conventional ammonia still is the tendency of the distillation column to become plugged or fouled. This results because solid calcium compounds which do not dissolve but instead form a dispersion tend to accumulate in and around the gas-liquid contacting means thereby restricting and eventually interrupting or interfering with the flow of steam. Fouling is particularly a problem in the free leg of the still. Once fouling occurs the still must be dismantled and cleaned thus resulting in substantial down time and increased expense. Even prior to complete fouling of the system, by virtue of buildup within the still, the still necessarily operates at reduced efficiency. As a result, ammonia stills for the distillation of weak ammonia liquor derived from coal coking operations have traditionally been designed with an excess capacity so as to be able to withstand a certain degree of fouling.

The patent seeks to overcome the clogging problem normally encountered by subjecting the incoming weak ammonia liquor to a preliminary precipitation with calcium hydroxide prior to its entrance into the ammonia still. Thus, prior to entering the free leg of the system, the liquor is treated in a lime leg which results in the precipitation of insoluble calcium salts prior to distillation. Such pre-precipitation essentially reduces the fluoride and carbonate ion concentrations in the weak ammonia liquor to the point where their calcium salts will not precipitate during distillation and cause clogging. The patent discloses an alternative attempt at overcoming the clogging problem in referring to the addition of caustic soda prior to distillation. By virtue of this substitution, calcium ions which are normally associated with the clogging problem are eliminated from the still. Although such a substitution has been found satisfactory from the point of view of fouling, the cost of caustic soda may vary and can prove very expensive depending on market conditions.

Furthermore, automatic pH control may still be very difficult in such systems since the addition of alkali results in a jump in pH due to the liberation of free ammonia.

Yet another problem inherent in conventional lime treatment processes is that lime, when added to the effluent, results in a colloidal solution. The solids formed when the lime contacts the waste liquor, make it virtually impossible to automatically control the process by means of sensors, automatic instrumentation, feedback control and the like, by virtue of the fact that the solids make accurate measurement of variables in the effluent impossible.

Although lime is listed as the preferred additive, U.S. Pat. No. 2,199,767 to WELLS et al does disclose the addition of soda ash to raw ammonia liquor which has been first treated by steam distillation. According to the patent, pH of the effluent stream from the steam distillation is adjusted by the addition of a basic material such as lime, soda ash, etc., subsequent to an electrolysis treatment step. The patent fails to take full advantage of the soda ash in that the soda ash is not added to the system until after the electrolysis treatment step and the still is apparently operated without the use of any additive whatsoever.

The aspect of the invention relating to the biological treatment of the distilled wastewater has received considerable attention in the patent and non-patent literature.

Thus, U.S. Pat. No. 2,199,767 to WELLS et al (referred to above) broadly discloses a bacterial treatment for coal-plant wastewater which has previously been electrolyzed to reduce its phenolic content. According to the patent, the pH control material is not added to the waste liquor until after the liquor has left the ammonia still thus precluding an interim treatment of the liquor within the still.

In a publication entitled "Design and Operation of Biological Treatment for Coke Plant Wastewaters" published by the Carnegie-Mellon Institute of Research, Pittsburg, PA. 15213, September, 1978, by G. M. Wong-Chong, the disclosure of which is herein incorporated, the author treats the various aspects of biological treatment of coke plant wastewaters. The publication makes reference to single-stage activated sludge treatment of the coke plant wastewater and generally discloses pre-treating the coke-plant wastewater by either steam distillation or physical-chemical phenol extraction so as to render the wastewater more suitable for a downstream activated sludge treatment. The publication further states (p. 85) that the process may be enhanced by means of the addition of activated carbon to the sludge in an amount of approximately 5.0 grams per liter. The publication makes a point of the fact that the carbon is used on a once-through basis and is not recycled except after having been regenerated.

Thus, while the publication generally recognizes the desirability of obtaining a no-growth activated sludge so as to maintain a constant microbial population within the activated sludge, there is no recognition whatsoever of how such conditions might be achieved so as to minimize the costs of activated sludge removal as well as activated carbon regeneration.

U.S. Pat. No. 4,132,636 to IWASE et al is illustrative of a prior attempt at biological treatment of coke plant waste liquor after pre-treatment for purposes of removing ammonia. According to the patent subsequent to pre-treatment to an ammonia content of 1,000 ppm or less, the liquor is biologically treated in a first tank and then transferred to a second tank where it is again biologically treated in an aerobic process. Powdered activated carbon is mixed with the liquor in the second biological treatment. Finally an iron salt is added to the twice treated liquor to cause coagulation and sedimentation. The process of the patent results in an increase in sludge as a result of the microbial activity even though activated carbon is used in one of the reactors.

Numerous patents have treated the problem of coke plant waste liquor in attempting biological treatment of which the following patents are exemplary: U.S. Pat. Nos. 1,437,394; 1,437,401; 3,278,423; and 4,009,098.

Attempts at improving the efficiency of biological treatment for purposes of wastewater purification have, as has been noted above, included the addition of carbonaceous material to the biological mass. The addition of the carbonaceous material has served as a substrate on which the bacteria could grow and proliferate. The carbon itself acts as an absorbent for some of the impurities in the wastewater. The following patents are exemplary of systems using carbon addition: U.S. Pat. Nos. 3,767,570; 3,871,999; 3,957,632; 3,980,556; and 4,132,636.

Although prior treatment processes have referred to the use of biological treatment steps, such treatments have been difficult to operate in practice and have necessarily entailed extremely careful monitoring of the biological mass which may be very expensive. Furthermore, the use of calcium ions in the treated wastewater has severely hindered the addition of phosphates to the wastewater, such phosphates being necessary for an effective biological treatment. When calcium ions are present they will precipitate as calcium phosphate.

Furthermore, prior art processes have consistently failed to achieve a stable biological population in the reactor thus necessitating costly sludge removal and post-treatment procedures. Thus, although the criticality of obtaining a zero-growth biological population might be readily appreciated, prior systems have consistently failed to accomplish this task with the necessary result that supplementary sludge treatment and removal systems are normally necessary.

SUMMARY OF THE INVENTION

It is, therefore, an object of the invention to provide a treatment system for removing both free and fixed ammonia and ammonia compounds which is both economical and commercially feasible.

It is a further object of the invention to provide a process and apparatus which avoids fouling and plugging problems in the ammonia still thus reducing down time and expense.

It is a further object of the invention to provide a process and apparatus which, by virtue of the treatment process, can be easily and accurately monitored and controlled with a minimum of supervision to meet stringent government regulations relating to water pollution standards.

It is yet another object of the invention to provide a waste liquor treatment process which is highly compatible with a biological treatment of the steam distilled waste liquor.

Yet another aspect of the invention relates to treating a coke plant wastewater by means of an ammonia still and a subsequent activated sludge treatment in which the net microbial growth rate of the activated sludge is substantially zero while nevertheless effectively reducing wastewater impurities to tolerable levels.

Yet another object of the invention resides in an activated sludge treatment step of ammonia-containing wastewaters in which the pre-treatment of the wastewater comprises the addition of inorganic carbon useful for cell synthesis which additionally assists in ammonia removal during the pre-treatment step without causing clogging.

These and other objects are fulfilled by means of the method of the invention which comprises removing ammonia from a wastewater containing free and fixed ammonia which process comprises the steps of: distilling the wastewater to remove the free ammonia; treating the distilled wastewater with soda ash to decompose the fixed ammonia; and distilling the treated wastewater to remove the decomposed ammonia.

In a preferred embodiment of the invention the wastewater treated comprises a raw ammonia liquor derived from a coal coking operation. Such a liquor comprises carbon dioxide, free cyanide compounds, oils and low boiling aromatic compounds, and the process of the invention comprises removing each of these additional compounds in the initial distillation step.

Yet another preferred aspect of the invention comprises performing each of the distillation steps of the invention in a packed distillation column. Preferably, the distillation is a low pressure steam distillation.

The soda ash is preferably fed to the distillation column in the form of an aqueous solution of $Na_2CO_3$ maintained as close as possible to saturation concentration. Thus, concentrations of 18–22% are normally used. Saturated solutions are preferred since the higher the soda ash concentration, the lower the steam consumption.

By virtue of the method of the invention the system may be accurately monitored by measuring the pH of the purified wastewater leaving the ammonia still and varying the amount of aqueous soda ash solution added to the wastewater so as to maintain the pH of the outgoing treated and purified wastewater at less than approximately 9.0. Most preferably the pH is maintained between 8.5 and 9 and it is most desirably maintained at approximately 8.6–8.7.

By virtue of the fact that soda ash is the treatment agent used, it is possible to automatically maintain the pH at the desired level without the necessity of manual intervention.

Although the system may be further controlled by varying the pressure of the steam used in each of the distillation steps so as to maintain the pH of the purified and treated wastewater at the desired level, it is an advantage of the invention that steam pressure may be kept constant and the pH regulated solely by varying the soda ash feed.

In yet another preferred embodiment of the invention it has been found that by virtue of the addition of soda ash instead of conventional treatment additives such as lime, the system is unusually compatible with a subsequent biological treatment step which serves to further purify the wastewater.

The objects of the invention are further fulfilled according to the method of the invention for removing biodegradable compounds selected from the group comprising: phenolics, free and fixed ammonia compounds, thiosulfates, thiocyanides, cyanides, sulfides and the like from a feed wastewater comprising the steps of: treating the feed wastewater by adding soda ash to the wastewater; and further treating the wastewater by means of an activated sludge treatment in a sludge reactor to reduce the level of the biodegradable compounds in the wastewater.

In a preferred aspect of the invention, the method involves operating the sludge reactor under conditions resulting in a solids retention time which is extremely and unexpectedly high, i.e., on the order of 100 to 1,000 days so as to yield an effluent having an impurity and solids concentration which is extremely low.

Another aspect of the invention comprises using an activated sludge which comprises powdered activated carbon to induce settling of the sludge when such is subsequently transferred from the reactor to a settling tank where the purified effluent is to be separated from the sludge. The amount of powdered activated carbon used is preferably in the range of 1,000–3,000 mg per liter of liquor in the reactor. The solids concentration within the reactor is maintained at a constant level in the range of about 4–11 grams per liter. A most preferred solids concentration is about 4 gms per liter.

The biological treatment of the invention is particularly efficacious when used in conjunction with the ammonia still treatment of the invention, particularly when used in conjunction with an ammonia still treatment comprising the addition of soda ash to the still between the fixed and free legs of the still.

A particularly valuable aspect of the invention resides in the fact that after having been biologically treated, the effluent is particularly suited for ion exchange treatment.

The activated sludge of the invention is preferably formed by adding wastewater of the type to be treated to a biological mass such as might be available from conventional municipal treatment plants to form a biospecific biological mass in which the bacteria are substantially autotropic. The biological mass is then stabilized by the addition of particles such that the average settling velocity of the sludge is approximately 2–5 lbs. per square foot per day. The average particle size of the particles is such that 98% of the particles pass through a 100 Tyler mesh screen (0.0056 inches). The preferred particle concentration is approximately 1,000–3,000 mg per liter. A very significant aspect of the invention is the use of soda ash as an inorganic carbon source which, in addition to assisting in the steam distillation pre-treatment, further acts as a source for cell synthesis for the autotopic bacteria which preferably constitute a substantial portion of the activated sludge bacteria.

Soda ash addition is important for yet another reason. The autotropic bacteria in the reactor act to oxidize ammonia and thiocyanates to form $NO_2$ ions which are ultimately oxidized to $NO_3$ ions. In the course of this oxidation hydrogen ions are produced which must be neutralized in order to maintain appropriate conditions for bacterial growth in the reactor. According to the invention the addition of soda ash to the system also serves this function.

The objects of the invention are further fulfilled by means of the apparatus of the invention which removes ammonia from wastewater containing free and fixed ammonia. The apparatus comprises an ammonia still for removing free and fixed ammonia and a source of soda ash solution. Means are provided for feeding the soda ash solution to the ammonia still to decompose the fixed ammonia.

In a preferred embodiment of the invention the ammonia still is a packed two stage distillation column.

A unique advantage of the apparatus is that means may be provided for measuring the pH of the purified wastewater and using these measurements to accurately control the system variables.

Thus, control means may be provided for varying the feed of the soda ash to the ammonia still, these control means being connected to the means for feeding the soda ash, and being adapted to vary the amount of soda ash being fed to the ammonia still so as to maintain the pH of the treated wastewater below approximately 9.0.

The source of soda ash solution preferably comprises a soda ash dissolution tank comprising 18–22% soda ash solution and most preferably a 22% solution, it being important that the solution be as close to saturation as concentration possible. The soda ash dissolution tank may further comprise a screw for conveying soda ash into the tank, a water inlet, and a steam inlet.

Most preferably, the apparatus may comprise automatic means connected to the control means for automatically varying the feeding of the soda ash to the still. The automatic means may additionally be adapted to automatically vary the amount of steam supplied to the ammonia still so as to maintain the pH of the purified wastewater below 9.0. However, most preferably the steam pressure is maintained constant within the still at 4–7 psig and only the soda ash feed is varied.

As has been previously noted, by virtue of the fact that the apparatus of the invention comprises a source of soda ash solution connected to the ammonia still, the apparatus may very efficaciously be used in conjunction with a downstream biological treatment means for further purifying the wastewater.

Thus, the objects of the invention are further fulfilled by means of an apparatus for treating a wastewater containing biodegradable compounds including free and fixed ammonia. The apparatus comprises an ammonia still for removing free and fixed ammonia; a source of soda ash solution; and means for feeding the soda ash solution from the soda ash source to the ammonia still to decompose the fixed ammonia in the wastewater. The means for feeding the soda ash are connected to the source of soda ash solution. A single-stage activated sludge reactor is further included for treating the wastewater to reduce the level of biodegradable compounds in the wastewater. Once again, the sludge preferably comprises activated carbon which is most preferably in the powdered state.

The apparatus of the invention may further comprise a settling tank adapted to receive the activated sludge from the activated sludge reactor for purposes of separating the solids from the activated sludge. Recycle means are also provided for recycling solids from the settling tank to the reactor.

In one embodiment of the invention, the apparatus further comprises ion exchange means for further purifying effluent leaving the settling tank whose solids have been previously separated.

BRIEF DESCRIPTION OF DRAWINGS

With reference to the annexed drawings.

DESCRIPTION OF PREFERRED EMBODIMENTS

Figure 1:
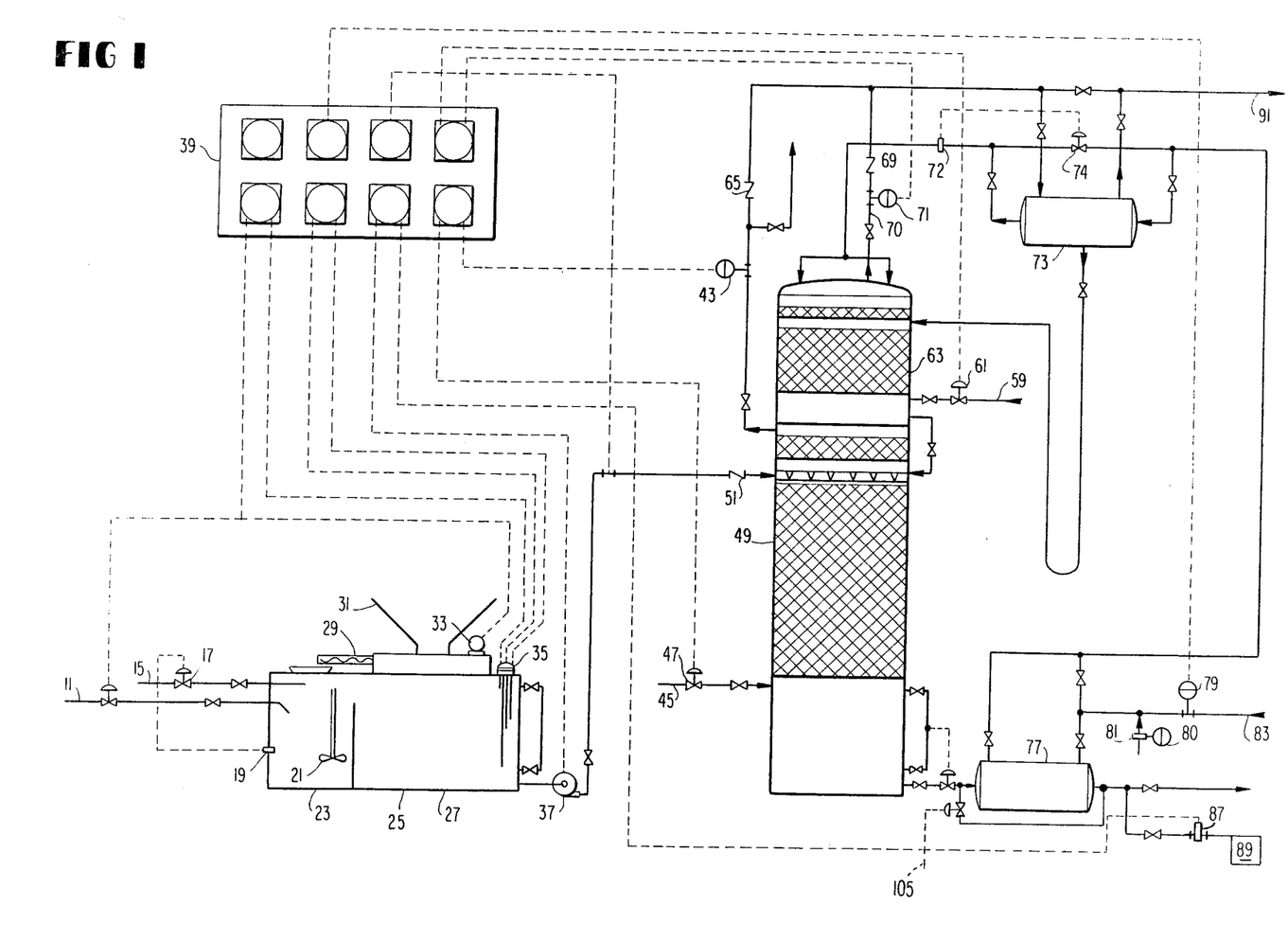
FIG. 1 schematically illustrates the ammonia still and control system of the invention.

As illustrated in FIG. 1, the invention is first directed to a two stage ammonia still treatment for treating coke plant wastewaters to remove free and fixed ammonia and ammonia compounds. A significant feature of the invention is the use of soda ash solution in conjunction with a steam distillation process as a means for decomposing stable or fixed ammonium salts for the removal of ammonia from the wastes. It has been surprisingly found that the use of soda ash enables the process to be completely trouble free with no problems of clogging or the like permitting around the clock operation with fully automated control systems. Soda ash has further been found to be highly desirable as an inorganic carbon source for purposes of cell synthesis in the autotropic bacteria.

As seen from FIG. 1, a raw ammonia containing liquor, such as a coke wastewater, 81, is fed into a heat exchanger 77 where it is pre-heated by purified wastewater as it passes countercurrently through the heat exchanger. The composition of the wastewater fed by line 81 can vary and typically contains approximately 4000–5000 mg/liter of ammonia of which approximately 3500–4500 mg/liter are in the form of fixed ammonia. The input to the system may be varied and may additionally contain other wastes having varying ammonia concentrations resulting from the coke production process as well as other effluents such as those resulting from benzol absorption and stripping, final coke oven gas coolers, desulfurizers and the like, fed through line 83. The mix or ratio of the two feeds is adjusted by means of a waste flow controller 79 and a liquor controller 80. It should be noted that although coke plant transfer is of primary interest, any of the recited effluents may be treated alone or in combination and the ratio adjusted as desired. The heated wastewater to be treated is then passed through heat exchanger 73, to the top of the two stage ammonia still which comprises free leg 63 in which "free" ammonia bearing compounds are distilled out of the wastewater together with oils, low boiling aromatics, cyanides and carbon dioxide. The still further comprises fixed leg 49 in which stable ammonium compounds are removed. A portion of the waste liquor to be treated may be diverted by means of valve 74 connected to a temperature controller 72 through heat exchanger 73 where it is countercurrently indirectly contacted with heated vapors leaving the fixed and free leg in order to control the still feed to a fixed preset temperature close to about 212 degrees F.

As shown, the still comprises a packed tower made up of two stages having a wastewater inlet and an outlet through which treated wastewater passes. Vapors are removed separately from each stage so as to provide a source of high quality ammonia leaving the second stage. The incoming wastewater, as it falls downwardly within the packed column, countercurrently contacts low pressure steam coming off of line 59 through pressure control valve 61 into the free leg 63. The steam is a low pressure steam having a pressure of approximately 10–12 psig although other pressures may quite obviously be used. Vapors leaving the fixed leg leave the system through line 70 and a check valve 69 and heat exchanger 73 prior to being fed into coke oven gas line 91. Carbon dioxide, free cyanides and ammonium compounds are removed from the free leg through this line. Pressure is preferably maintained at approximately 4–7 psig within the packed column by means of pressure controllers 71.

After having been partially purified the stripped liquor flows from the free leg to the fixed leg through a liquid distributor tray and once again cascades downwardly and countercurrently to rising steam being fed from line 45 through check valve 47. It is in this stage that soda ash solution, preferably having a concentration of about 18–22%, is added through check valve 51. The amount of soda ash added is controlled by means of control panel 39 and is a function of the pH of the purified wastewater as it is sensed by pH control probe 87. A portion of the purified liquid may be sent to a sampler unit 89. It has been found preferable to maintain a pH of less than 9.0 in the effluent. Advantageously the pH is 8.5 to 9.0 and most preferably is between 8.6–8.7. By virtue of the fact that the system is relatively stable with respect to pH upon the addition of the $Na_2CO_3$, measurement of pH by probe 87 may accurately be used to control the addition of soda ash to the system. Also, since the soda ash added to the system helps to liberate or free ammonia compounds within the cascading light stream, rising steam removes decomposed previously stable ammonium compounds which may likewise be fed into the cook oven gas line 91. Pressure within the fixed leg of the system is maintained by means of pressure controller 43. By valve adjustment, a portion of the vapors leaving the fixed leg may be diverted and used in other ammonia related processes. Consistent with economical operation, each of the heat exchangers as well as the column itself are insulated to keep heat losses to a minimum. A key feature of this system is the soda ash dissolution tank 25 in which service water coming from line 11 is mixed with soda ash coming from feed bin 31 to form a solution of the desired concentration maintained constant prior to being fed to the fixed leg of the system. Soda ash, coming from feed bin 31 is delivered to the tank 25 by means of a feed screw 29. The screw is driven by means of motor 33. The ash is delivered into mixing section 13 of the tank maintained at constant liquid level where it is mixed with water and heated and agitated by low pressure steam fed through line 15. The amount of steam used is varied by means of control valve 17 as a function of the temperature within the tank as sensed by means of probe 19. The temperature of the soda ash solution is preferably maintained at approximately 140 degrees F. The mixture is agitated by means of propeller 21, although other means may be used, in the mixing section 23 of tank 25. The mixed liquid passes over a weir and into the feed section 27 of the tank prior to being pumped into the fixed leg by means of pump 37 regulated as a function of the pH sensed by sensor 87. The level of solution within the tank is variable and is controlled by means of control 35 which senses the liquid level and is connected to panel 39. The concentration of the soda ash solution may be varied by regulating the amount of water added through line 11 as well as the amount of soda ash added to the system by means of screw 29. The solution is maintained at a concentration of approximately 18–22% and preferably at a concentration which approaches saturation concentration as closely as possible at the temperature of the solution.

It may be seen from the above description that the invention lends itself to complete automation by virtue of control panel 39 which was not the case in previous caustic and lime systems. Such automation is possible by virtue of the precise pH control made possible when using soda ash in the fixed leg of the still.

Likewise, by virtue of the minimal clogging problems which result when soda ash is used, it is possible to use a packed column instead of the conventional tray or bubble cap type column which had been previously necessary when dealing with lime. Such a system makes it possible to operate at extremely high contact efficiencies and thus results in minimal steam consumption. Thus, by virtue of the process and apparatus used, it has been found that steam consumption may be kept down to as low as 1.2 pounds per gallon of feed wastewater and even lower. The process of the invention thus successfully minimizes the amount of energy necessary to generate the steam required.

By virtue of the use of soda ash in the fixed leg, the purified wastewater is highly compatible with a subsequent bacteriological treatment. The soda ash acts as a carbon source for autotropic bacteria for the decomposition of thiosulfates, thiocyanates and left over ammonia.

In an alternative embodiment of the invention, the still may be operated without the use of any steam whatsoever. This may be done by operating the still under high vacuum on the order of about 2–3 psia such that the liquor flashes upon entering the column by virtue of the temperature to which it has been pretreated by any available heat with or without the use of steam. Thus, by heating the liquor to approximately 65–70 degrees centigrade the liquor will flash as it enters the still and generate the necessary steam for sweeping the ammonia vapor. In such a system heat exchanger 77 is not needed because of the low temperature of the still effluent.

The invention permits the removal of phenolics, free and fixed ammonia, thiosulfate, thiocyanates, cyanides, sulfides and other biodegradable compounds from coke plant wastewaters as well as other wastewaters. Preferably, a single-stage bacteriological suspended growth treatment system specially designed to achieve nitrification is used. This suspended growth or activated treatment will now be described in greater detail.

A very important and unexpected aspect of the invention is the ability of the apparatus and method of the invention to provide an extremely low sludge waste, thus substantially reducing sludge handling costs and inconveniences.

As has been pointed out above, a very important aspect of the invention is the use of biological treatment in conjunction with ammonia still wastewater treatment and is an essential part of the invention.

If desired, the influent to the ammonia still may additionally first be treated by chemical absorption to reduce phenol content to the desired level prior to distillation. Such a removal step essentially involves solvent-solvent phenol extraction from the effluent by countercurrently passing the effluent in contact with a phenol solvent such as toluene which is then itself stripped of phenol by countercurrent extraction with caustic prior to being recycled. Although phenolic removal may be performed, such is unnecessary when operating within the context of the invention, and is optional. Thus, the invention offers the significant advantage of eliminating the chemical absorption phenolic removal step thus further simplifying the process and reducing cost.

A significant feature of the invention is the use of a single-stage activated sludge biological reactor having a reactor inlet and a reactor outlet which serves to further remove biodegradable compounds, including ammonia remaining in the previously distilled wastewater.

The feed to the single stage biological reactor comprises at least a portion, if not the entire effluent from the ammonia still. The soda ash in the effluent acts as an inorganic carbon source for cell synthesis by autotropic bacteria responsible for decomposition of ammonia, cyanides, thiocyanates, thiosulfates, sulfides and the like. Autotropic bacteria such as those belonging to the Actinomycetaceae family, e.g., Thiobacillus Thiocyanoxidans, and the like are representative of the autotropic bacteria which may be present in the activated sludge.

As has been pointed out above, an important feature of the invention is the use of powdered activated carbon in the reactor. Activated carbon has a high surface area and allows the microbial population to grow around the particles themselves, thus increasing their reactivity. In addition to acting as a substrate for microbial growth, the activated carbon also improves the settling properties of the autotropic microbial mass, thus tremendously increasing the purity of the final effluent leaving the settling tank by virtue of its unusually low suspended solids content. As a result of the use of carbon, the reactor is run at very high solids retention times, i.e., about 100 to 1,000 days, thus resulting in high quality treatment in a single-stage reactor. Because the effluent of the reactor is substantially free of activated carbon, the reactor maintains the desired loading and the settling tank continues to exhibit a fast settling rate for periods of 3-6 months without any need for carbon addition. Thus, the system does not require regular carbon addition as is often the case in conventional systems, and severely minimizes the necessity for carbon regeneration, which is so costly and often burdensome.

The non-biological particulate material should preferably be such so as to result in relatively fast settling rates in the settling tank. When operating under optimal conditions, the system should exhibit virtually no solids in the effluent leaving the settling tank by virtue of the activity of the particulate material. Autotropic sludge generally exhibits a relatively poor settling rate, particularly when operating with coke plant wastewaters. It is thus one aspect of the invention that the addition of particular activated carbon has been unexpectedly found to cause the activated sludge system to exhibit normal settling rates. As in other systems, settling occurs in the settling tank by means of "zone settling".

Although the invention has been described with respect to particulate activated carbon, the invention is not limited to activated carbon and other particulate solids exhibiting the desired settling rate, substrate surface, etc., may likewise be substituted for the carbon of the invention. Particulate materials such as clay, fly ash and the like may thus be substituted under carefully controlled conditions. A preferred powdered activated carbon for purposes of the invention is PREMIUM DARKO (powdered dry-cleaning carbon). The average particle size of the carbon is such that 98% of the particles pass through a 100 Tyler mesh screen (0.0058 inches) and the sludge will exhibit a settling rate of about 2-5 lbs. per square foot of settling tank per day in the settling tank.

As was noted above, the system may be operated at very high solid retention times in the reactor, with almost complete solids recycle. Such conditions develop a very stable biological population having a steady solids loading. Solids content of the activated sludge is generally maintained at a level between about 4-11 grams/liter and is preferably maintained at about 4 grams per liter although other solids loading rates may be used. It has been unexpectedly found that when operating under the conditions of the invention, the activated sludge reaches a point where it exhibits zero net growth, thus resulting in a very stable mass requiring little maintenance, and very little waste which need be removed. Although not wishing to be bound to any single theory, this unexpected result is believed to be due to the presence of high organisms, such as protozoa and the like which are present in the biological population and act to control microbial population and maintain a steady solids level in the reactor.

As has been noted above, the optimum wastewater pH leaving the fixed leg of the still is about 8.6 to 8.7. However, for purposes of the activated sludge treatment the pH must be further reduced to a preferred value of 7.4

According to the invention the ammonia content of the effluent leaving the reactor is to be as low as possible. While ammonia removal may be accomplished in both the still and the reactor, removal in the still is far less costly. Whereas only 3.79 mg. of soda ash addition is required per mg of $NH_4^{+(N)}$. When it is removed in the still, about twice as much ash (7.57 mg.) is required per mg. of $NH_4^+(N)$ when it is removed in the reactor. Quite clearly then, better ammonia removal in the still results in reduced soda ash consumption, thus rendering the system more cost-effective.

The concentration of impurities in the influent to the reactor is carefully controlled. Preferred ranges of impurity effluent are as follows:

Phenol: 0-500 ppm
Ammonia: 50-200 mg per liter
COD: 300-600 ppm
Thiocyante: 80-200 ppm
Thiosulfate: 50-200 ppm
Sulfide: 0-10 ppm Although the dissolved oxygen level in the reactor is maintained above about 4 mg./liter, by virtue of the extremely low net sludge production rate in the reactor as well as the low phenol and ammonia concentrations which are preferably used in the influent to the reactor, the oxygen requirement for chemical decomposition and bacterial mass respiration remains relatively low. As is the case with respect to the ammonia still, the reactor system of the invention readily lends itself to complete automatic control with failsafe shut-down arrangement. In the event of an upset in any part of the system, the control sounds an alarm and automatically shuts off the feed so that the operator may correct the problem before starting the system up again. By completely automating the system so as to guard against system upset, down times often encountered in conventional systems resulting in extended periods of non-use and startup are avoided.

Figure 2:
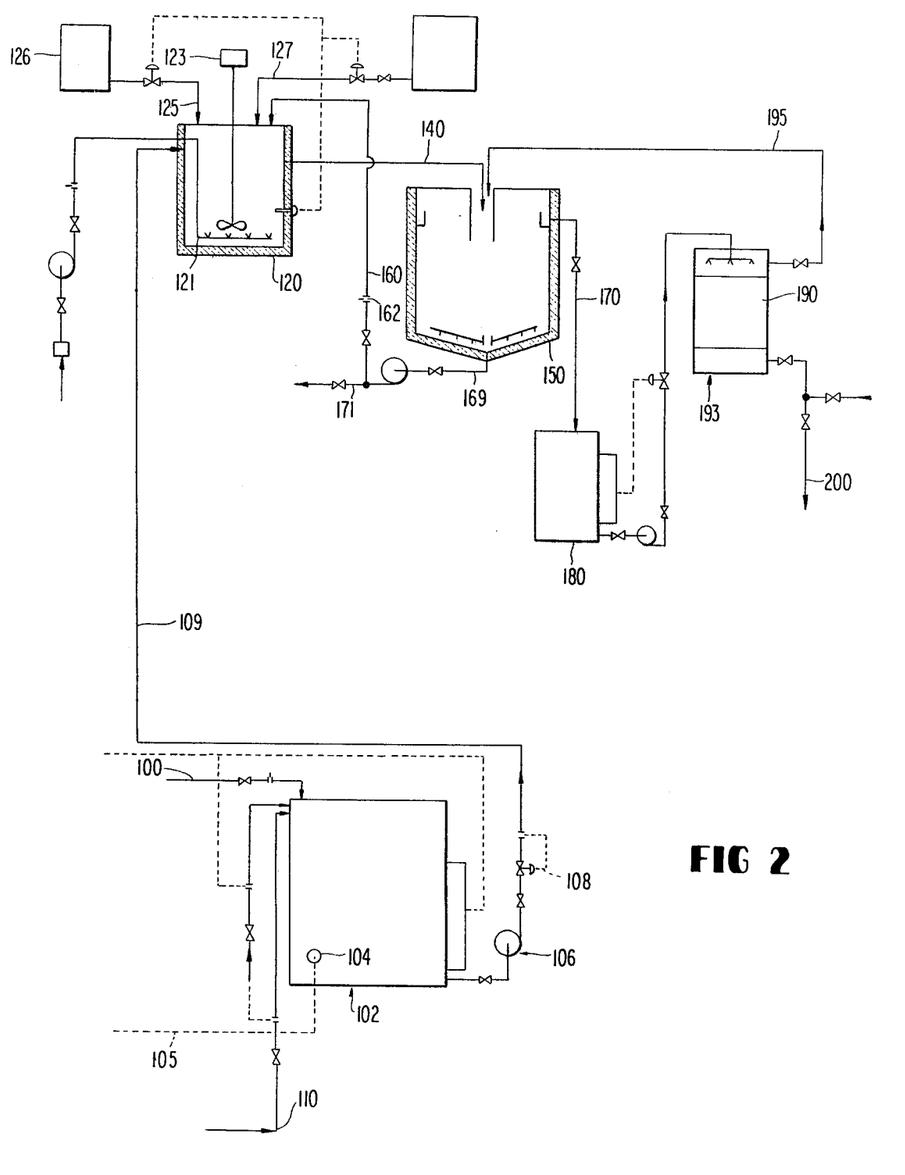
FIG. 2 schematically illustrates the biological treatment steps of the invention.

Returning to the drawings, as seen from FIG. 2, effluent 100, leaving the ammonia still, is stored in tank 102. The temperature of the liquid in the storage tank 102 is controlled by a temperature controller 104 and 105 controlling the still waste temperature by varying the amount of effluent passing through heat exchanger 77. This temperature varies with changing seasonal conditions so that control is necessary to maintain the desired temperature range of 20-30 degrees C. in the reactor. The tank is also provided with a level controller feed pump 106 and flow controller 108. Flow controller 108 is set to a desired flow rate and may be changed manually. The level controller serves to maintain the level in the tank by adjusting the feed 83 into the ammonia still (FIG. 1) and is attached to a proprotional flow controller so as to adjust the volume of dilution water 110 being fed into the tank in proportion to the ammonia still feed. Dilution water 110 may be either lake water or settled quench tower water, and may be mixed with the still effluent in a ratio of between about 1:0 to about 1:3. Tank 102 is insulated to minimize heat losses. Pump 106 pumps influent 109 into reactor 120. Reactor 120 is an insulated tank provided with a sparger 121 as well as motor-driven aerators. This combination improves air distribution in the system, and maintains a uniformly distributed D.O. level in the reactor above about 4 mg per liter. The reactor is preferably rectangular in cross-section and is preferably provided with a vertical driver (not shown) so as to permit the use to use only half of the tank at low feeds while nevertheless taking advantage of the same level controllers and the like used for operation at full reactor loads thus adding far greater flexibility to the system. Each of the reactors is, therefore, provided with comparable controls and the like.

A pH controller controls the pH within the reactor to a level of between about 6.5 to 7.5. In actual operation, the pH is preferably maintained at a level of about 7.4 by the addition of a soda ash solution 125 having a concentration of about 5-22% from tank 126. The alkalinity of the system is preferably maintained at about 100-150 mg/liter (expressed as calcium carbonate) in the reactor. The pH control system is further equipped with means for providing an acid stream 127 comprising sulphuric or phosphoric acid. Such capability is important in the event that quick correction of an upset situation becomes necessary. In normal operation no acid need be added.

In the event the pH controller fails, the feed to the system is shut off and an alarm is sounded. The alarm system further shuts off the feed to the ammonia still and water is collected in an equalization tank (not shown in FIG. 1) during the shutdown. The equalization tank is designed to hold water for at least four days. A temperature controller, not shown, is also located in the reactor tank such that a sudden drop in reactor temperature is automatically adjusted by direct steam heating.

The activated sludge of the invention is biospecific and comprises bacteria which are substantially autotropic. The sludge may be initially generated by the following process.

The reactor is first filled with water at the onset of start-up and is seeded with biological solids collected from any treatment plant, such as, for example, a municipal treatment plant. Solids concentration in the reactor is initially held to 1.5 gms/liter. The pH and the temperature of the reactor is brought within the limits of automatic control, and feed is then started. During start-up of the system, the feed rate is initially kept at a very low level and a high percentage of dilution water is used. The feed rate and composition is slowly brought to a normal level over a period of about 3-6 weeks while checking the efficiency of the biological treatment on a daily basis. About 500-1500 mg per liter of activated carbon powder is added to the system once halfway through the start-up period and then again at the beginning of full-capacity start-up. The same dosage is repeated about once every two months during initial full start-up. Once the system is in full and regular operation, carbon addition is not anticipated more often than once every 6 months and the carbon level stays at about 1,000-3,000 mg/liter. Although carbon has repeatedly been referred to as the means used for settling solids within the system, it is to be remembered that the system is not limited to carbon addition, and that other suitable materials may be used instead. Becuase of the unique design and operating characteristics of the system, once having been started up the reactor is able to operate with a hydraulic retention time of approximately 0.5-2 days and a solids retention time of about 100-1,000 days. When operating properly, the reactor effluent has an unexpectedly low impurity concentration. The effluent comprises about 0-0.5 ppm phenol, about 0-0.5 ppm ammonia, 200-500 ppm COD, about 1-2 ppm thiocyante, about 4-6 ppm thiosulfate; and about 0.5-1 ppm sulfides.

Effluent liquor 140 leaving the reactor is fed to a settling tank 150 having an inlet and two outlets, where the solids are permitted to settle out before being collected and then being pumped back through to the reactor through of line 160. Solids leaving the settling tank through line 169 have a concentration of about 11-15 gms/liter. A recorder 162 records the volumetric flow of solids being recycled to the reactor which will vary between about 0.25 and 0.75 based upon the feed volume to the settling tank. The system is designed so as to accommodate complete recycle, thus resulting in virtually zero solid waste if such is desired. Nevertheless, the system is capable of handling excess solid wastes which result during periods of abnormal use and overload. Such solids are removed through line 171 from which they may be treated in any conventional fashion, e.g., dewatered, etc.

Takeoff 170 from the settling tank is passed to an effluent storage tank 180 provided with a level controller from which it may be pumped to a filter 190. The filter may be a sand filter or a deep bed filter provided with a back flush feed line 193. Backwashed solids are returned to the settling tank via line 195. Effluent 200 leaving the filter, having a very low impurities concentration, may then be subjected to yet another treatment in an ion exchange system, itself also provided with a regenerative backflush system (not shown).

The invention has been described with respect to particular preferred embodiments. It is to be understood, however, that the method of the invention is not limited to the particular apparatus disclosed and that the apparatus of the invention may be used in ways other than the method specifically disclosed without departing from the scope of the invention.

What is claimed is:

1. A method for removing biodegradable compounds selected from the group comprising: oils, volatile organics, phenolics free and fixed ammonia compounds, thiosulfates, thiocyanates, cyanides, sulfides and the like from a feed wastewater comprising the steps of:
    (a) distilling said wastewater to remove said free ammonia compounds, oils and volatile organics;
    (b) adding soda ash to said wastewater and steam distilling said wastewater to remove said fixed ammonia compounds;
    (c) treating said wastewater of step (b) by means of an activated sludge treatment in a single stage sludge reactor comprising biological solids, said solids reactor further comprising particulate solids selected from the group comprising clay, fly ash, powdered activated carbon, or the like adapted to improve the settling characteristics of said sludge and running said reactor at a solids retention time of about 100-1000 days, said activated sludge exhibiting substantially no net biological growth to produce an effluent comprising biological and particulate solids;
    (d) separating said biological and particulate solids from said solids containing effluent of steps (c); and
    (e) recycling substantially all of said separated solids from said settling tank to said activated sludge reactor whereby substantially no solids wasting occurs.

2. The method as defined by claim 1 wherein said activated sludge reactor comprises about 1,000-3,000 mg/liter of particulate solids.

3. The method as defined by claim 2 wherein said activated sludge reactor has a total solids content of about 4-11 gm/liter.

4. The method as defined by claim 3 wherein said effluent from which said biological and particulate solids have been separated has an impurity concentration of about 0–0.5 ppm phenol, 0–0.5 ppm ammonia, 200–250 ppm COD, 1–2 ppm thiocyanate, 4–6 ppm thiosulfate, and 0.5–1 ppm sulfide.

5. The method as defined by claim 4 further comprising measuring the pH of the wastewater of step (b) and maintaining said pH between about 7.4 and 7.8 by the addition of soda ash.

6. The method as defined by claim 1 wherein said wastewater is a coke plant wastewater.

7. The method as defined by claim 1 wherein said treatment of step (b) comprises adding said soda ash in the form of an 18–22% soda ash solution to remove said fixed ammonia compounds.

8. The method as defined by claim 7 comprising steam distilling said wastewater in a packed column to remove said free and fixed ammonia compounds, oils and volatile compounds.

9. A method for removing biodegradable compounds selected from a coke-plant wastewater comprising:
   (a) steam distilling said wastewater in a free leg of a still to remove free ammonia compounds, oils and voltatile organics;
   (b) treating the steam distilled wastewater of step (a) in a fixed leg of said still, said fixed leg comprising a packed column, by adding a soda ash solution to said fixed leg and steam distilling said distilled wastewater of step (a);
   (c) treating said distilled wastewater of step (b) by means of an activated sludge treatment in a single stage sludge reactor comprising biological solids, said solids reactor further comprising particulate solids selected from the group comprising clay, fly ash, powdered activated carbon or the like in a concentration of about 1,000–3,000 mg/liter to improve the settling characteristics of said sludge, the total solids concentration said reactor being about 4–11 gm/liter, and running said reactor at a solids retention time of about 100–1000 days, said activated sludge exhibiting substantially no net biological growth to produce an effluent comprising biological and particulate solids;
   (d) separating said biological and particulate solids from said effluent of step (c) in a settling tank to produce an effluent having an impurity concentration of about 0–0.5 ppm phenol, 0–0.5 mg./liter ammonia, 200–250 ppm COD, 1–2 ppm thiocyanate, 4–6 ppm thiosulfate and 0.5–1 ppm sulfide with an influent concentration to said reactor of 0–500 ppm phenol, 50–200 mg./liter ammonia, 300–600 COD, 80–200 ppm thiocyanate, 50–200 ppm thiosulfate, 0–10 ppm sulfide; and
   (e) recycling substantially all of said separated solids from said settling tank to said activated sludge reactor whereby substantially no solids wasting occurs.

10. The method as defined by either of claims 1 or 9 wherein said activated sludge requires particulate solids addition no more often than once in three months while nevertheless maintaining said and biological solids concentration within said reactor at the desired level.

11. The method as defined by claim 10 wherein said particulate solids have an average particle size such that about 98% of the particles pass through a 100 Tyler mesh screen.

12. The method as defined by either of claims 1 or 9 where said activated sludge is formed by the steps of:
   (a) adding said wastewater to a biological mass to form an autotropic biospecific biological mass; and
   (b) stabilizing said biological mass by adding particulate solids to said mass whereby the sludge exhibits an average settling velocity of about 2–5 lbs. per square foot per day.

13. An apparatus for removing biodegradable compounds selected from the group comprising: phenolics, free and fixed ammonia compounds, thiosulfates, thiocyanates, cyanides, sulfides, oils, volatile organics and the like from a feed wastewater, said apparatus comprising:
   (a) a packed column adapted to treat said feed wastewater, said packed column comprising a wastewater inlet, an outlet through which treated wastewater passes; and a soda ash inlet for feeding soda ash into said column;
   (b) first pH measurement means arranged at the treated wastewater outlet, said pH measurement means being adapted to measure the pH of wastewater leaving said outlet;
   (c) a soda ash source connected to said soda ash inlet; said pH measurement means, being connected to means for controlling the amount of soda ash fed to the system;
   (d) fail safe means connected to said pH measurement means, said fall safe means comprising automatic shutdown means and temperature control means for preventing pH and temperature fluctuation in said wastewater leaving said wastewater outlet;
   (e) a sludge reactor, having a reactor inlet and a reactor outlet comprising an activated sludge containing particulate solids selected from the group comprising: clay, fly ash, powdered activated carbon or the like, said sludge reactor being operatively connected to said wastewater outlet whereby said treated wastewater can flow from said wastewater outlet to said sludge reactor through said reactor inlet, said activated sludge comprising a total solids concentration of approximately 4–11 gm/liter, said reactor further comprising pH measurement means for measuring the pH in said reactor, said reactor pH measurement means being coupled to said fail safe means for preventing pH fluctuations in said reactor;
   (f) a settling tank having an inlet and two outlets for separating effluent from said activated sludge reactor into a purified effluent and solids; and
   (g) recycle means connected between one of said outlets of said settling tank and a solids inlet to said reactor for recycling said separated solids from said settling tank to said sludge reactor;
whereby the solids retention time of said sludge withing said apparatus is about 100–1000 days.

14. The apparatus as defined by claim 13 wherein said sludge reactor is a single stage sludge reactor.

15. The apparatus as defined by claim 14 wherein said wastewater inlet is connected to a coke plant wastewater source.

* * * * *

UNITED STATES PATENT AND TRADEMARK OFFICE
CERTIFICATE OF CORRECTION

PATENT NO. : 4,271,013
DATED : June 2, 1981
INVENTOR(S) : Aniruddha Bhattacharyya It is certified that error appears in the above—identified patent and that said Letters Patent is hereby corrected as shown below:

Col. 1, line 8, "continuation-in-part" should be --Continuation-in-Part--.

Col. 3, line 25, "Pittsburg" should be --Pittsburgh--.

Col. 9, line 2, "light" should be --liquid--.

Col. 11, line 7, --carbon-- should be inserted before "loading".

Col. 12, line 4, ".When" should be --When--;
line 4, "$NH_4^{+(N)}$" should be --$NH_4^+(N)$;
line 64, "driver" should be --divider--; and
line 65, "use" (first occurrence) should be --user--.

Col. 14, line 1, "of" should be deleted;
line 34, --,-- should be inserted after "phenolics";
line 55, "steps" should be --step--.

Col. 16, line 57, "withing" should be --within--;
line 4, "where" should be --wherein--.

Signed and Sealed this

Twenty-second Day of September 1981

[SEAL]

Attest:

GERALD J. MOSSINGHOFF

*Attesting Officer*    Commissioner of Patents and Trademarks